United States Patent [19]

De Ligt

[11] 3,953,713

[45] Apr. 27, 1976

[54] REEL DIAMETER DISCRIMINATOR

[75] Inventor: John De Ligt, Covington, Va.

[73] Assignee: Westvaco Corporation, New York, N.Y.

[22] Filed: Nov. 4, 1974

[21] Appl. No.: 520,496

[52] U.S. Cl. .................. 235/92 DN; 235/92 PK; 235/92 MP; 235/92 R; 235/151.32; 242/201
[51] Int. Cl.² .......................................... H03K 21/36
[58] Field of Search ...... 235/92 DN, 92 PK, 92 MP, 235/92 PE, 151.32; 242/201; 33/142

[56] References Cited
UNITED STATES PATENTS

| | | | |
|---|---|---|---|
| 3,160,741 | 12/1964 | Gottschall et al. | 235/92 R |
| 3,538,729 | 11/1970 | Sterrett, Jr. | 235/92 DN |
| 3,564,219 | 2/1971 | Mutziger | 235/92 PE |
| 3,652,832 | 3/1972 | Baumann | 235/92 PE |
| 3,659,081 | 4/1972 | Piccione | 235/92 PE |
| 3,710,084 | 1/1973 | Slagley et al. | 235/92 DN |
| 3,824,694 | 7/1974 | Lesperance et al. | 235/92 DN |
| 3,834,648 | 9/1974 | Rose et al. | 235/92 DN |
| 3,838,254 | 9/1974 | Halter | 235/92 DN |

Primary Examiner—Gareth D. Shaw
Assistant Examiner—John P. Vandenburg
Attorney, Agent, or Firm—W. Allen Marcontell; Richard L. Schmalz

[57] ABSTRACT

A web or sheet material supply reel is monitored for minimum diameter in anticipation of a continuously running splice from an exhausted supply reel to a fresh supply reel. The monitoring technique is to combine electrical pulses proportional to the passage of a linear quantity of material with pulses proportional to the number of arcuate reel degrees simultaneously rotated past a reference point. The reel arc generated pulses are accumulated by a digital counter during the interim between linear quantity pulses. When the accumulated count reaches a predetermined magnitude between linear quantity pulses, a signal is emitted to initiate the splice transfer.

9 Claims, 3 Drawing Figures

3,953,713

REEL DIAMETER DISCRIMINATOR

BACKGROUND OF THE INVENTION

1. Field Of The Invention

The present invention relates to the monitoring of the quantity of a web, sheet or strand material wrapped upon itself about a reel.

More specifically, the present invention relates to an apparatus for measuring the diminishing diameter of a web or sheet material supply reel for the purpose of initiating a splice transfer at an economically optimum moment.

2. Description Of The Prior Art

Various paper web converting operations such as printing, embossing and corrugating utilize a turret type unwind strand having two or more spider arms to axially mount respective reels of paper web. As the web from one reel is exhausted, the leading edge of a fresh reel is secured to the tail of the exhausted reel web for the uninterrupted continuation of the web supply. As the fresh reel diminishes, the turret spider is rotated to the first position and another fresh reel is mounted in readiness.

At a constant web withdrawal rate in the order of 600 fpm (185 meters per minute) for example, acceleration of the supply spool makes it very difficult to consistently anticipate the web ending for the purpose of splicing thereto the leading edge of a fresh roll. Conversely, the normal practice of completing the splice cautiously in advance of the foregoing web tail is, by virtue of cumulative absolutes, the source of considerable web wastage.

In the past, numerous techniques have been devised to eliminate the inconsistency of manual judgment from the web splicing unit. Such techniques have included rider rolls designed to throw a limit switch when the rider reaches a predetermined arcuate position relative to the critically small diameter of the diminishing supply reel. Although simple, the mechanism for this technique is exposed and vulnerable to considerable abuse. Moreover, although more consistently accurate (when operative) than human judgment, this device lacks for desired accuracy.

Another prior art technique for anticipating a web reel end includes apparatus for measuring web linear velocity and the angular velocity of the diminishing reel. An analog comparison is made of these two measurements and when the appropriate combination is reached for a predetermined reel diameter, an alarm or other appropriate signal is issued. While this technique eliminates the presence of appurtenant structure subject to operational damage, due to tolerance limits of analog indicators and the accuracy thereof, further room remains for improvement.

SUMMARY OF THE INVENTION

The present invention precisely measures a relatively small linear increment of web in close proximity to and issuing from the diminishing web reel. Electrical pulses delineate the passage of the measured increment.

Simultaneously, electric pulses are issued to delineate passage of a small arcuate degree of supply reel rotation.

A digital counter continuously accumulates the reel arc delineation pulses during the interim between linear web increment delineate pulses whereupon the arc count is erased and started over.

As the supply reel diminishes in diameter, a greater number of arc pulses are accumulated between linear pulses until a predetermined number of arc counts is reached that is indicative of the remaining supply reel diameter. This event initiates the action of a web transfer roller which presses the depleted supply web tail against the surface of a fresh supply roll for a splice connection pickup.

The exact digital count required to initiate the web transfer may be analytically determined for a given web thickness by the formula described herein.

BRIEF DESCRIPTION OF THE DRAWING

Relative to the drawing wherein like reference character designate like or similar elements.

DESCRIPTION OF THE PREFERRED EMBODIMENT

Figure 1:
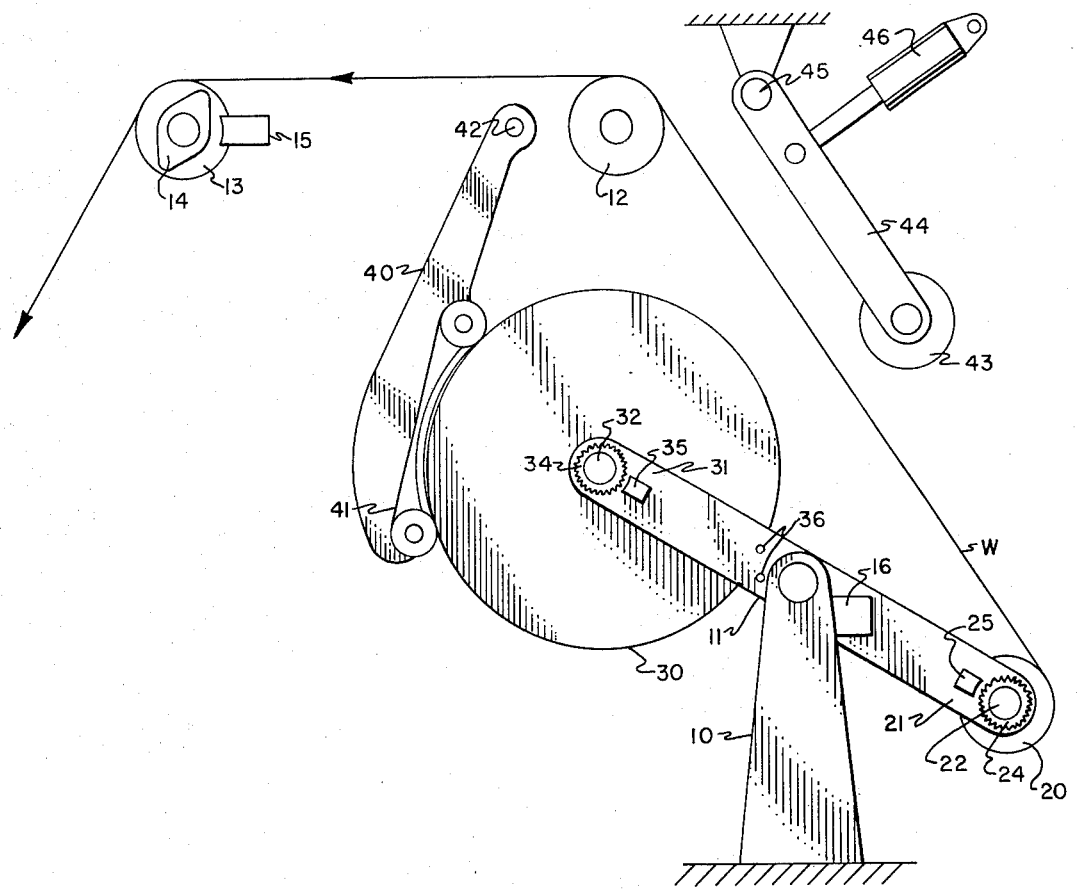
FIG. 1 is a schematic elevation of the present invention apparatus.

With reference to FIG. 1 of the drawing, a reel unwind stand comprising a support pedestal 10 and rotatable turret spider 11 is shown supporting a depleted web 20 at the distal end of spider arm 21 and a fresh web reel 30 at the distal end of spider arm 31. Both reels 20 and 30 are supported for free rotation about the axes thereof on journals 22 and 32, respectively.

Mechanism 40 is a selectively engageable surface drive for fresh reel 30 comprising a motor driven endless belt 41. The mechanism is supported on a journal 42 to permit clearance area during the mounting and deployment of fresh reel 30.

On the opposite side of supply web W issuing from depleted reel 20 is disposed a hard, smooth surface splicer roll 43 rotatably mounted at the distal end of splicer arm 44. Rotation of the roll 43 and arm 44 assembly about journal 45 is controlled by fluid pressure actuated linear motor device 46 having sufficient stroke to swing the splicer roll from engagement with the surface of fresh reel 30 to a position of spacial clearance for the index of the reel 30 from the mounting position shown to the supply position of depleted reel 20.

As supply web W issues from the depleted reel 20, it is threaded over lead rollers 12 and 13 along the prescribed course into the converting apparatus not shown. Lead roller 13 is provided with a precisely dimensioned circumference of 2 feet (0.6095 meters), for the example shown to teach this embodiment. At one journal end of measured circumference lead roller 13 is secured a two lobed cam 14. Mounted adjacent the cam 14 circle of rotation is a pulse generator 15 such as an Electro Corporation Di-Mag Sensor Model No. 58403. Pulse generator 15 may be a proximity switch type of device which emits a pulse of electric current upon the event of a cam lobe passing with a certain close proximity thereto.

Reel journals 22 and 32 are provided with similar pulse generation devices including generators 25 and 35 actuated by 30 tooth gears 24 and 34, respectively, i.e. one tooth for each 12° of circular arc about the reel circumference. Both reel pulse generators are provided with respective electric connector contacts 36 for the purpose of energy conduction and pulse transmission relative to a control panel 16. The relationship between the control panel 16 and connector contact set 36 respective to a particular spider arm is such that when the particular arm is indexed to the supply position of reel 20, a proper connection will be made such as by resilient brushes, for example. Other connector contact set 36 will be inactive.

Figure 2:
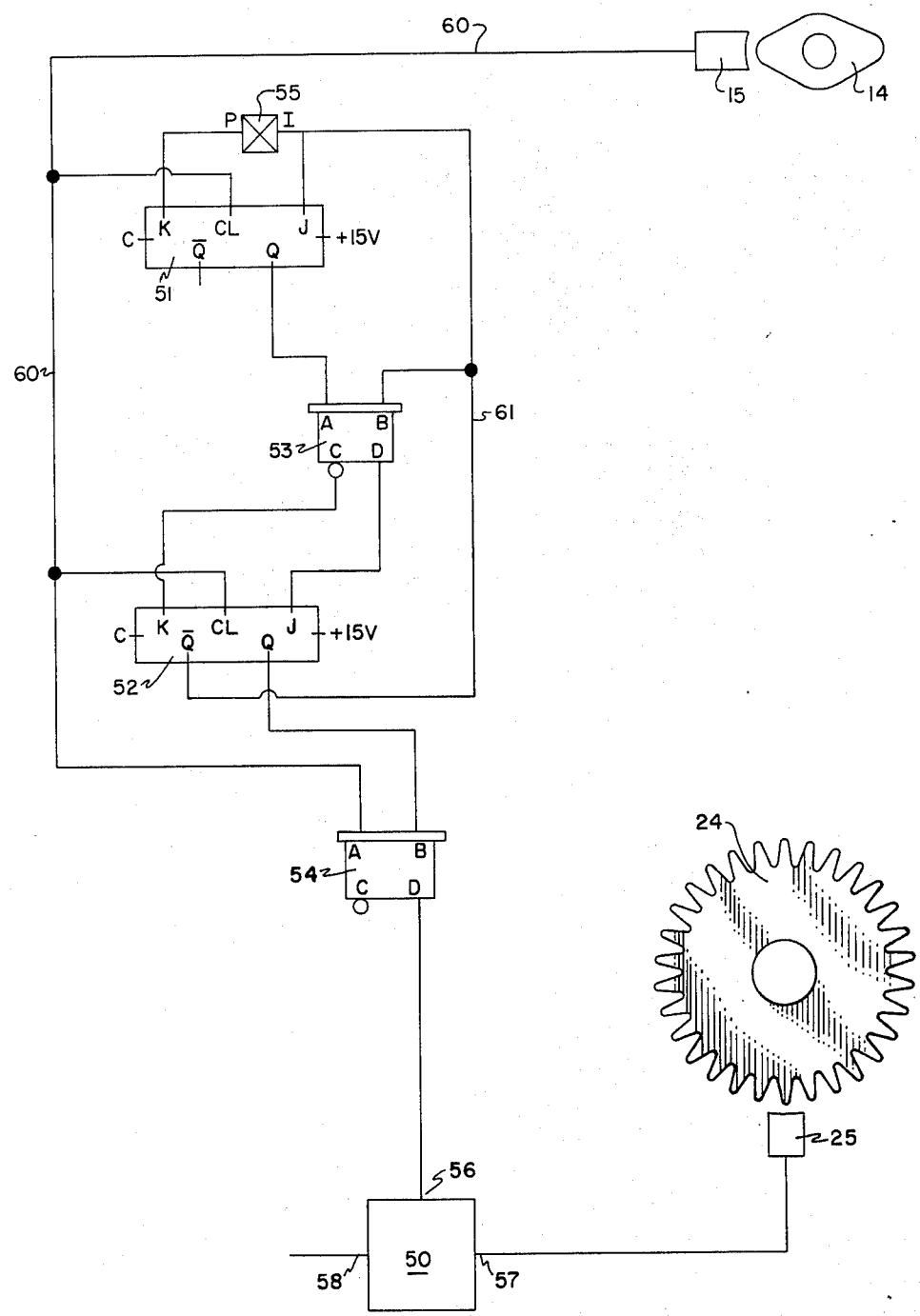
FIG. 2 is an electric schematic of the apparatus required to manage the signal pulses in the manner specified by the invention.

The control panel 16 also contains those electrical components and connective circuitry necessary to accomplish the control objective of the invention, a portion of which includes the circuitry illustrated by the FIG. 2 schematic.

In FIG. 2 there is shown the pulse generators 15 and 25 connected to a reset counter 50. Interposed between the pulse generator 15 and the reset counter 50, however, is a division-by-3 circuit comprising two J-K flip-flop conductors 51 and 52 such as an Allen-Bradley Cardlok Cat. No. 1720-L601; two "AND" gates 53 and 54 such as an Allen-Bradley Cardlok Cat. No. 1720-L002; and a "NOT" gate 55 such as an Allen-Bradley Cardlok Cat. No. 1720-L310.

The functional characteristics of these flip-flops 51 and 52 are such that a pulse received by clock terminal CL will be transmitted to one or the other of output terminals Q, $\overline{Q}$. The determination of which output terminal Q, $\overline{Q}$ to receive the pulse is determined by the presence of a voltage bias on switch terminals J and K at the time the previous pulse is transmitted. Therefore, if the conduction circuit between clock terminal CL and output terminal Q is stable at the time a pulse is received, pulses will continue from CL to Q so long at there is is no bias on switch terminal K. However, should a bias be present on K at such time, the circuit will transmit the next pulse to output terminal Q, as before, but immediately thereafter switch to connect the CL terminal with output terminal $\overline{Q}$ for transmission of the next pulse.

Reset terminal C sets the switch condition to a preferred or reference position when bias is applied thereto.

The AND gates 53 and 54 must have a bias on both input terminals A and B for pulse emission from output terminal D. Simultaneous with a bias on both terminals A and B, output terminal C discontinues a steady output bias condition.

The NOT gate 55 simply discontinues a steady state bias from output terminal P when a pulse is received at input terminal I.

The objective of the division-by-3 circuit of FIG. 2 is to allow only 1 pulse in 3 carried by conduit 60 from generator 15 to pass to the reset terminal 56 of counter 50. In the meantime, counter 50 accumulates a pulse count at terminal 57 for each 12° of circular arc passing the reel pulse generator 25. When the accumulated number of generator 25 pulses reaches a predetermined quantity before being reset by receipt of a pulse at terminal 56, a comparator circuit in counter 50 will emit a signal from terminal 58. By conventional electric control circuitry not shown, the signal emitted from terminal 58 actuates a valve operator, also not shown, to admit pressurized fluid to the cylinder of linear motor 46 whereby the splice roll 43 is pressed against the surface of fresh reel 30.

In operation, withdrawal of the web W from reel 20 over lead roll 13 rotatively drives gear 24 and cam 14, respectively. Consequently, generator 25 emits an electric pulse for each 12° of reel 20 rotation and generator 15 emits a pulse for each linear foot of supply web passing thereover.

Pulses from generator 15 are carried simultaneously to the clock terminals CL of flip-flops 51 and 52 and to the "A" input terminal of AND gate 54. Upon emission of the first pulse of a 3 pulse cycle, the circuits to "Q" terminals of both flip-flops 51 and 52 are open and those to the $\overline{Q}$ terminals are closed. These are the reference positions established by a manually or automatically applied bias to reset terminals C of flip-flops 51 and 52.

There being no bias on input terminals A of AND gates 53 and 54, a steady state bias is emitted from output terminals C thereof.

Similarly, the absence of a bias at input terminal 1 of NOT gate 55 conditions the emission of a steady state bias from output terminal P thereof.

Consequently, a steady state bias is present on input terminals K of flip-flops 51 and 52 at the time the first pulse is received from pulse generator 15.

When said first pulse is received from generator 15, conduit 60 distributes it to the clock terminals CL of the flip-flops and to the A input terminal of AND gate 54. Because of the bias on terminal K of flip-flop 52, the pulse received by terminal CL thereof is passed to output terminal $\overline{Q}$ thereof without changing the switch condition. Conduit 61 passes the pulse on to terminal B of AND gate 53, terminal J of flip-flop 51 and terminal 1 of NOT gate 55.

There being no bias on terminal A of AND gate 53, no bias issues from terminal D and the steady state bias from terminal C thereof continues. However, the bias at terminal 1 of NOT gate 55 causes a discontinuance of bias from P terminal thereof. Consequently, the bias on terminal K of flip-flop 51 is discontinued simultaneously with the application of a bias on terminal J before the completion of the first pulse transient to output terminal $\overline{Q}$. This condition occasions the switching of continuity from terminal CL to terminal Q upon completion of the first pulse treatment.

Receipt of the first pulse by terminal A of AND gate 54 causes no condition change therein to either of output terminals C and D since no complimentary bias is present on input terminal B.

When the second pulse is received by flip-flop 51, it is conducted to terminal Q and further to terminal A of AND gate 53. Simultaneously, the second pulse is conducted from terminal CL of flip-flop 52 to terminal $\overline{Q}$ thereof and on to conductor 61 as in the case of the first pulse. However, this time, because of a bias presence at terminal A of AND gate 53, the pulse at terminal B of AND gate 53 is transmitted on to terminal D thereof and the steady state bias emitted from terminal C of AND gate 53 discontinues. Therefore, a bias is applied to terminal J of flip-flop 52 simultaneous with the termination of bias at terminal K and before completion of pulse transient from CL to $\overline{Q}$ thereof. This condition causes a switching of continuity to output terminal Q of flip-flop 52 at the end of the second pulse transient.

As with the first pulse, a bias on terminal 1 of NOT gate 55 interrupts the bias at terminal P and therefore, at terminal K of flip-flop 51. Likewise, the bias at terminal J of flip-flop 51 continues the CL-Q continuity at the end of the second pulse transient.

Also as with the first pulse, an isolated bias at terminal A of AND gate 54 without a corresponding bias on terminal B thereof merely continues the standing bias of unconnected outer terminal C.

When the third consecutive pulse is issued by generator 15, both flip-flops 51 and 52 are set with CL-Q continuity. Accordingly, no bias is applied to conduit 61. Therefore, when flip-flop 52 receives the third pulse, it is transmitted directly to terminal B of AND gate 54. This time, because a bias is applied to both terminals A and B of AND gate 54, a pulse is emitted from output terminal D thereof to the reset circuit of counter 50.

Simultaneously, because of the absence of a bias on terminal 1 of NOT gate 55, a steady state bias is standing on terminal K of flip-flop 51 and none is present on terminal J. Accordingly, when the third pulse transient is complete, flip-flop 51 continuity switches from CL-Q to CL-$\overline{Q}$, the initial state condition.

Transmission of third pulse bias from terminal Q of flip-flop 51 to terminal A of AND gate 53 without a corresponding bias on terminal B thereof fails to interrupt the standing bias from output terminal C to terminal K of flip-flop 52. Accordingly, when the third pulse transient is completed through CL-Q of flip-flop 52, the continuity thereof switches to CL-$\overline{Q}$, the initial state condition.

When the reset circuit of counter 50 receives the third pulse, the accumulated number of counts is erased from the counter 50 memory which begins again to accumulate counts from generator 25.

However, when the accumulated count in the memory of counter 50 reaches a predetermined number, the splicer roll motor 46 is actuated by a signal emitted at counter terminal 58.

The fresh reel 30 is prepared for splicing by the application of a strip of double face adhesive tape across the web leading edge thereof. The reel is then driven by apparatus 40 up to the rotational speed appropriate for a surface speed equivalency to the supply web W velocity.

When linear motor 46 presses the supply web W against the surface of reel 30, within one revolution thereof, the remaining tail of the supply web W is secured to the outer adhesive face of the double face tape and, consequently, to the leading edge of the fresh reel 30 web. Thereafter, the turret arm is rotated to index the fresh reel to the normal supply position and a second fresh reel is mounted on journal 22 in readiness.

The splice actuating count determination is concluded by the summation of several factors including the circumference of a fresh reel and the normal web velocity plus a small margin for error.

A mininum tail length equivalent to the fresh reel circumference is required to assure a connection between the fresh and exhausted webs within the possible maximum of one reel 30 rotation.

The normal web velocity is used to determine the quantity of web that will pass under the splicer roll 43 in the interim between signal emission from the counter 50 and the moment the supply web W is actually pressed against the fresh roll 30 surface.

These foregoing factors are added to conclude a minimum residual splice length L. By multiplying the residual splice length L by the web thickness t, the total residual edge area may be concluded. This residual edge area is combined with the reel core area $A_c$ to conclude the critical residual diameter D of depleted reel 20 at which the splicing sequence starts. These criteria are combined by the relationship:

$$(L \times t) + A_c = \frac{\pi}{4} D^2$$

Knowing, therefore, the residual diameter D, the splice sequence initiating count, n, accumulated by counter 50, may be determined by the relationship:

$$n \cdot \frac{\pi D}{P_{20}} = w$$

where: $P_{20}$ is the number of pulses emitted by generator 25 during one revolution of reel 20.

w is the length of web passing over the lead roll 13 during the counter 50 reset interim.

In the case of the particular embodiment of the invention described herein, the absolute value of $P_{20}$ is 30 since an arcuate interim of 12° per pulse was selected for the supply reel.

By design analysis, the absolute value of web length w should be 36 inches. However, logic will recognize the loss of approximately 1 inch of web measurement during the reset interim due to electrical transients occurring during the advance and retreat of a lobe of cam 14 relative to the proximity sensor of generator 15. Accordingly the absolute value of w is 36-1=35 inches.

Utilizing, therefore, the absolute values of the described embodiment:

$$n = \left( \frac{36-1}{\pi \cdot D} \right) 30$$

The preferred embodiment of the invention has been described herein relative to a paper web reel unwind stand. It should be understood, however, that the particular material drawn from the reels is irrelevant as to practice of the invention and may include such materials as metal foils, textiles, cords, ropes and cables.

Figure 3:
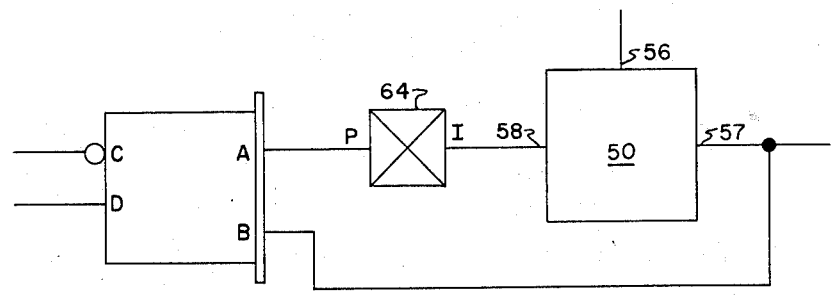
FIG. 3 is an electric schematic of the apparatus required to manage signal pulses in a manner specified by an alternative embodiment of the invention.

Moreover, by appropriate modification, the invention may be used in reverse to signal a terminal diameter for reel building. Such a modification may take the form of that illustrated by FIG. 3 wherein the output terminal 58 of counter 50 is connected to the input terminal 1 of a NOT gate 64. Further, the output terminal P of the NOT gate is connected to input terminal A of AND gate 65. Shunting the counter 50 is a direct connection between pulse generators 25 to the other AND gate terminal B.

In operation, the counter 50 would emit a bias at output terminal 58 as long as the accumulated count between resets exceeded the predetermined number. So long as a bias exists on NOT gate 64 terminal I, no bias is present at terminal P. Without a bias at NOT gate 64 terminal P, there is no bias at AND gate 65 to terminal A. Consequently, the pulse bias received by AND gate 65 terminal B will not cause an actuating signal bias from terminal D.

When, however, the count accumulated by counter 50 falls below the number corresponding to the selected maximum reel diameter, the bias at terminal 58 is cut off which, in turn, initiates a bias from NOT gate 64 terminal P. This event applies a bias to AND gate 65 terminal A which, when accompanied by a bias direct from counter 25, causes a signal bias to be emitted from AND gate 65 terminal D. This signal from terminal D may be used to actuate known automatic web shearing and reel transfer mechanisms not shown.

Another exploitation of the subject invention may include the diametric measurement of a large cylinder being ground or turned to precise dimension. In this case, the linear measurement roll 13 is positioned to be driven directly by the surface of the workpiece cylinder. The cutting tool may be advanced automatically by selected increments until the counter 50 accumulates the predetermined number whereupon the output signal from terminal 58 causes the cutting tool to be automatically withdrawn from workpiece engagement.

Having throughly described the preferred embodiments of my invention, I CLAIM:

1. A reeled material diameter monitoring apparatus comprising:

An axis for rotatively supporting a reel of flexible material;

Means to rotate said reel about said axis;

Means to generate a first electrical pulse signal, each pulse being responsive to the passage of a predetermined number of arcuate degrees of said reel rotatively passing a reference point;

Means to generate a second electrical pulse signal, each pulse being responsive to the passage of a predetermined linear magnitude of said reeled material past a reference point;

Counting means having count reset means connected to said first signal generating means to digitally accumulate the number of first signal pulses received between a reset interim;

First and second flip-flop signal conductors, each having a clock terminal, first and second directional bias terminals and first and second output terminals;

First and second AND signal gate conductors, each having first and second bias terminals and first and second output terminals;

A NOT signal gate conductor having signal input and output terminals;

Means to conduct said second signal to said first and second clock terminals and the first bias control of said first AND gate conductor;

Means to connect said first directional bias terminal of said first flip-flop conductor to the output terminal of said NOT gate conductor;

Means to connect said first directional bias terminal of said second flip-flop conductor to the first output terminal of said second AND gate conductor;

Means to connect said second directional bias terminal of said first flip-flop conductor to the first bias terminal of said second AND gate conductor, to the first output terminal of said second flip-flop conductor, and to the input terminal of said NOT gate conductor;

Means to connect the second output terminal of said first flip-flop conductor to the second bias terminal of said second AND gate conductor;

Means to connect said second bias terminal of said second flip-flop conductor to the second output terminal of said second AND gate conductor;

Means to connect said second output terminal of said second flip-flop conductor to the second bias terminal of said first AND gate conductor;

Means to connect said second output terminal of said first AND gate conductor to a reset terminal of said first signal counting means; and Means to emit an electrical signal upon the accumulation of a predetermined magnitude of said first pulses, said predetermined magnitude of first pulses being proportional to a predetermined diameter of said reel.

2. Apparatus as described by claim 1 wherein said first pulse signal generating means comprises a circular element secured to said axis for rotation thereabout with said reel, said circular element having a number of tooth elements about the circumference thereof arcuately spaced by said predetermined number of degrees, said tooth elements rotatively passing proximity switch means whereby said first pulses are generated.

3. Apparatus as described by claim 1 wherein said means to generate said second pulse signal comprises a roll of measured circumference driven rotatively by circumferential friction contact with said reeled material, said roll further comprising a cam shaped element rotatively driven by said measured roll rotation, a lobe portion of said cam element disposed to actuate proximity switch means whereby one of said second signal pulses are generated for each unitary increment of said reeled material passing over said roll.

4. A reeled material unwind stand comprising:

Turret means for rotatively supporting a supply reel and a fresh reel of said material at supply stations and loading stations, respectively;

Means for drawing said material from each of said reels at said stations;

Lead roll means of measured circumference rotatively driven by surface contact with said material drawn from said supply reel;

A material supply course extending tangentially from said supply reel onto and partially about said lead roll;

Splice roll means diposed on the opposite side of said material supply course from said loading station;

Motor means to positionally shift said splice roll means into surface engagement with said material in said supply course and into pressing engagement with the surface of said fresh reel at said loading station;

Arcuate degree pulse generating means connected with said supply reel for generating an electrical pulse responsive to the rotation of a predetermined number of arcuate degrees of said supply reel past a reference point;

Counting means having count reset means connected to said arcuate degree generating means to digitally accumulate the number of arcuate degree pulses received between a reset interim;

Linear measure pulse generating means connected with said lead roll for generating an electrical pulse responsive to the passage of a predetermined linear measure of said material over said lead roll;

First and second flip-flop signal conductors, each having a clock terminal, first and second directional bias terminals and first and second output terminals;

First and second AND gate conductors, each having first and second bias terminals and first and second output terminals;

A NOT signal gate conductor having signal input and output terminals;

Means to conduct linear measure pulses to said first and second clock terminals and the first bias terminal of said first AND gate conductor;

Means to connect said first directional bias terminal of said first flip-flop conductor to the output terminal of said NOT gate conductor;

Means to connect said first directional bias terminal of said second flip-flop conductor to the first output terminal of said second AND gate conductor;

Means to connect said second directional bias terminal of said first flip-flop conductor to the first bias terminal of said second AND gate conductor, to the first output terminal of said second flip-flop conductor, and to the input terminal of said NOT gate conductor;

Means to connect the second output terminal of said first flip-flop conductor to the second bias terminal of said second AND gate conductor;

Means to connect said second bias terminal of said second flip-flop conductor to the second output terminal of said second AND gate conductor;

Means to connect said second output terminal of said second flip-flop conductor to the second bias terminal of said first AND gate conductor;

Means to connect said second output terminal of said first AND gate to a reset terminal of said arcuate degree pulse counting means;

Comparator means to emit an electrical actuating signal when said number of arcuate degree pulses reaches a predetermined magnitude proportional to a selected diameter of said supply reel; and, Actuating means responsive to said actuating signal to operate said motor means to press said material supply course into engagement with said fresh reel to splice the reeled material on said fresh reel to the remaining reeled material on said supply reel.

5. An unwind stand as described by claim 4 wherein said arcuate degree pulse generating means comprises a circular element secured for rotation with said supply reel, said circular element having a number of tooth elements about the circumference thereof arcuately spaced by said predetermined number of degrees, said tooth elements rotatively passing proximity switch means whereby said arcuate degree pulses are generated.

6. An unwind stand as described by claim 4 wherein said linear measure pulse generating means comprises a cam shaped element rotatively driven by said lead roll, a lobe portion of said cam element disposed to actuate proximity switch means whereby one of said linear measure pulses are generated for each unitary increment of said material over said roll.

7. Variable diameter cylinder monitoring apparatus for signaling the arrival of a variable diameter cylinder rotating about the axis thereof at a predetermined diametric dimension, the improvement comprising:

Arcuate degree pulse generating means for emitting an electrical pulse upon the passage of a predetermined number of arcuate degrees of said rotating cylinder past a reference point;

Pulse counting means having count reset means connected to said arcuate degree pulse generating means to digitally accumulate the number of arcuate degree pulses received between a reset interim;

Linear magnitude pulse generating means for emitting an electrical pulse upon the passage of a predetermined linear quantity of said rotating cylinder circumferential surface past a reference point;

First and second flip-flop signal conductors, each having a clock terminal, first and second directional bias terminals and first and second output terminals;

First and second AND signal gate conductors, each having first and second bias terminals and first and second output terminals;

A NOT signal gate conductor having signal input and output terminals;

Means to conduct said linear magnitude pulses to said first and second clock terminals and the first bias terminal of said first AND gate conductor;

Means to connect said first directional bias terminal of said first flip-flop conductor to the output terminal of said NOT gate conductor;

Means to connect said first directional bias terminal of said second flip-flop conductor to the first output terminal of said second AND gate conductor;

Means to connect said second directional bias terminal of said first flip-flop conductor to the first bias terminal of said second AND gate conductor, to the first output terminal of said second flip-flop conductor, and to the input terminal of said NOT gate conductor;

Means to connect the second output terminal of said first flip-flop conductor to the second bias terminal of said second AND gate conductor;

Means to connect said second bias terminal of said second flip-flop conductor to the second output terminal of said second AND gate conductor;

Means to connect said second output terminal of said second flip-flop conductor to the second bias terminal of said first AND gate conductor;

Means to connect said second output terminal of said first AND gate conductor to a reset terminal of said arcuate degree pulse counting means; and, Comparator means to emit a responsive signal when the accumulated number of arcuate degree pulses reaches a predetermined magnitude proportional to a selected diameter of said cylinder.

8. Variable diameter cylinder monitoring apparatus as described by claim 7 wherein said arcuate degree pulse generating means comprises a circular element secured for rotation with said cylinder, said circular element having a number of tooth elements about the circumference thereof arcuately spaced by said predetermined number of arcuate degrees, said tooth elements rotatively passing proximity switch means whereby said arcuate degree pulses are generated.

9. Variable diameter cylinder monitoring apparatus as described by claim 7 wherein said linear magnitude pulse generating means comprises a roller of fixed circumference rotatively driven at a linear surface velocity substantially identical to that of said variable diameter cylinder, said roller rotatively driving a cam shaped element having a lobe portion disposed to actuate proximity switch means whereby one of said linear magnitude pulses are generated for each unitary increment of variable diameter cylinder circumference.

* * * * *

UNITED STATES PATENT OFFICE
CERTIFICATE OF CORRECTION

PATENT NO. : 3,953,713
DATED : April 27, 1976
INVENTOR(S) : John DeLigt

It is certified that error appears in the above-identified patent and that said Letters Patent are hereby corrected as shown below:

Column 1, line 36, delete "unit" and insert therefor --task--.
Column 1, line 37, correct the spelling of --rolls--. Column 1, line 67, delete "delineation" and insert therefor --generated--.
Column 1, line 68, delete "delineate" and insert therefor --delineation--. Column 2, line 32, following "web", insert --reel--. Column 3, line 20, after "No." should be --1720-L610 --. Column 4, line 9, "$\bar{Q}$" should be in quotes. Column 4, line 41, delete "treatment" and insert therefor --transient--.
Column 6, line 51, delete the "s" on --generator--. Column 6, line 54, "as", first occurrence should be --so--. Column 7, line 41,(Claim 1, line 28,)delete "control" and insert therefor --terminal--. Column 8, line 26,(Claim 4, line 5,)delete "each" and insert therefor --either--.

Signed and Sealed this

Seventeenth Day of August 1976

[SEAL]

Attest:

RUTH C. MASON
*Attesting Officer*

C. MARSHALL DANN
*Commissioner of Patents and Trademarks*